(12) United States Patent
Davis et al.

(10) Patent No.: US 8,755,176 B2
(45) Date of Patent: Jun. 17, 2014

(54) DATA STORAGE SYSTEM, AN ENERGY MODULE AND A METHOD OF PROVIDING BACK-UP POWER TO A DATA STORAGE SYSTEM

(75) Inventors: David M. Davis, Portsmouth (GB); Alexander C. Worrall, Waterlooville (GB)

(73) Assignee: Xyratex Technology Limited, Havant (GB)

( * ) Notice: Subject to any disclaimer, the term of this patent is extended or adjusted under 35 U.S.C. 154(b) by 208 days.

(21) Appl. No.: 13/271,818

(22) Filed: Oct. 12, 2011

(65) Prior Publication Data

US 2013/0094135 A1 Apr. 18, 2013

(51) Int. Cl.
*H05K 5/00* (2006.01)
*H02B 1/00* (2006.01)
*H02B 11/12* (2006.01)

(52) U.S. Cl.
USPC .. 361/679.01; 361/601; 361/608; 361/679.02

(58) Field of Classification Search
None
See application file for complete search history.

(56) References Cited

U.S. PATENT DOCUMENTS

| | | | |
|---|---|---|---|
| 5,604,662 A * | 2/1997 | Anderson et al. | 361/679.32 |
| 5,915,122 A | 6/1999 | Tsurumi | |
| 6,169,249 B1 * | 1/2001 | Teachout et al. | 174/559 |
| 6,597,073 B1 | 7/2003 | Check | |
| 7,414,835 B2 * | 8/2008 | Katakura et al. | 361/679.33 |
| 7,639,486 B2 * | 12/2009 | Champion et al. | 361/679.32 |
| 7,643,281 B2 * | 1/2010 | Okamoto et al. | 361/679.33 |
| 7,719,834 B2 * | 5/2010 | Miyamoto et al. | 361/695 |
| 7,852,627 B2 * | 12/2010 | Schmitt et al. | 361/695 |
| 8,107,225 B2 * | 1/2012 | Rasmussen et al. | 361/601 |
| 8,305,748 B2 * | 11/2012 | Wang et al. | 361/679.32 |
| 2005/0182981 A1 | 8/2005 | Hayashi | |
| 2010/0091449 A1 * | 4/2010 | Clidaras et al. | 361/679.49 |
| 2011/0072290 A1 | 3/2011 | Davis et al. | |
| 2011/0222234 A1 | 9/2011 | Davis et al. | |
| 2012/0055012 A1 | 3/2012 | Gauthier et al. | |
| 2012/0098343 A1 * | 4/2012 | Harris et al. | 307/48 |

FOREIGN PATENT DOCUMENTS

| | | |
|---|---|---|
| EP | 1 361 516 | 5/2011 |
| JP | 2003-323787 | 11/2003 |

OTHER PUBLICATIONS

Great Britain Combined Search and Examination Report dated Feb. 18, 2013 in corresponding Great Britain Patent Application No. GB1217756.4.
U.S. Appl. No. 12/843,725, filed Jul. 26, 2010, Graham Collins.
U.S. Appl. No. 12/843,711, filed Jul. 26, 2010, Graham Collins.

* cited by examiner

*Primary Examiner* — Boris Chervinsky
(74) *Attorney, Agent, or Firm* — Pillsbury Winthrop Shaw Pittman LLP

(57) ABSTRACT

The invention provides a data storage system for connection to a primary power source, the data storage system comprising: one or more data storage media; one or more interfaces, each interface able to connect to at least one of the data storage media so as to couple power from the primary power source to the at least one of the data storage media; one or more energy modules, each energy module being able to connect to an interface for providing back-up power to the one or more of the data storage media in the event of a failure of the primary power source.

12 Claims, 8 Drawing Sheets

DATA STORAGE SYSTEM, AN ENERGY MODULE AND A METHOD OF PROVIDING BACK-UP POWER TO A DATA STORAGE SYSTEM

The present invention relates to a data storage system, an energy module and a method of providing power to a data storage system.

As more users tend to store data remotely in data centres the need to ensure the safety and reliability of the stored data increases. Loss of power to a data centre can pose a risk to the data stored. A loss of power may arise due to a power cut in the external supply to the data centre or due to a failure of power supply units with the data storage systems provided in the data centres.

FIG. 1 shows a schematic representation of a data storage system as might be provided within a data centre. The data storage system 1 includes power supply units 3 coupled to a power source which is typically the AC mains power supply. The power supply units would typically also be arranged to provide cooling to the storage system but this is not important for present purposes. The data storage system 1 includes one or more controller units 5 which may include an input/output (I/O) system having one or more I/O units or modules. An interface such as a midplane 7 is provided arranged to couple data and power between a host (not shown) to which the data storage system 1 would, in use, be connected and one or more data storage devices 11 connected to a baseplane within the drawer.

Within the drawers 13, baseplanes (not shown in FIG. 1) provide routing for data and power from the midplane 7 to the storage devices 11. The I/O units or modules are provided to write data to and read data from the data storage devices 11. In the example shown, the data storage devices 11 are provided in drawers 13 which couple to the midplane. One or more drawers are preferably provided within a sub-unit of the data storage system referred to as a storage module.

FIG. 2 shows a schematic representation of a drawer 2 as might be provided in a storage module. One such data storage system from which such a drawer might be used is that provided by the assignee of the current application and referred to as the Xyratex OneStor UD (or "Titan") storage system. Such a system is described in the co-pending and co-assigned application US-A-2011/0072290. This system is further disclosed in, for example, U.S. patent application Ser. Nos. 12/722,012, 12/843,725 and 12/843,711, the entire contents of all of which are hereby incorporated by reference. The Titan system is merely one example of a storage system and the present disclosure is of course not limited to use in such a system.

The Titan storage system comprises a rack into which are placed plural storage modules. Each of the storage modules contains two drawers (only one of which is shown in FIG. 2) which in turn each contain plural disk drives. At the rear of the storage system, storage interface modules provide control, input and output functionality. Typically the storage interface modules communicate with the storage media via a midplane to which the drawers connect. Suitable cabling may be provided to enable the drawers to be withdrawn from the storage system whilst still remaining connected to the midplane. The storage interface modules provide the means by which data may be written to or read from individual disk drives or storage media within the storage system.

Referring again to FIG. 2, plural storage media, such as hard disk drives, are provided within the drawer. In fact any suitable type of data storage media could be provided, other examples including Solid State Drives (SSDs). The housing of the drawer is not shown so as to enable the arrangement and configuration of disk drives within the drawer to be clearly seen. As shown, plural drives are provided arranged in rows 6. In the example shown, there are three rows 6 of disk drives 4, each row having a corresponding base plane 8. Data and power connectivity is provided as shown schematically at 9. In other words, AC power provided to the storage system typically is routed via the rear of the storage system, converted to DC by a power supply unit and from there to the baseplanes so as to enable individual disk drives to be powered.

Due to the power requirements of each drawer, the power supply is effectively segmented into a number of divided supplies which may each be considered as a source of power for an independent power domain In the example shown, each drawer receives eight power supplies, four left and four right. The eight supplies and arranged into five power domains, one domain for each side card (not shown, but provided at the sides of the drawer), and one domain for each of the front, mid and rear baseplanes. The domains provide the drawer with power redundancy, allowing part or all of the four left power supplies to fail, whilst maintaining the drawer in a functional state with the four right power supplies. Although left and right side cards have their own power supplies which each form a separate domain, each of the front, mid and rear baseplanes are a single domain. The baseplane domains are each fed by two power supplies, one left and one right. These domains are separate, isolated from each other, and electrically protected to prevent feedback into a failed circuit, i.e. if the right supply to a baseplane fails, the left supply continues to power the baseplane, but is prevented from feeding power into the right supply. In a similar manner, if both feeding power supplies fail or are disconnected any power source, or sources, within the domain is restricted to powering only the domain in which it resides. These domains allow the power supplies to each domain to be monitored and controlled, and it is this mechanism which allows power to the drawers to be selectively disabled in the event of AC failure.

Some I/O systems store data received from, for example, the host control system in cache memory before writing the cached data to the data storage media. Whilst the data is stored in the cache memory, the I/O system may indicate to the host control system that the data has been written to the storage media when in fact the data is still stored in the cache memory. Cached data may be subject to processing or editing before being written to the data storage media. However, cache memories are typically volatile memories and data stored in them are vulnerable to loss in the event of an AC power supply failure.

In currently available data storage systems such as that described in US-A-2011/0072290, the I/O modules are provided with auxiliary power supplies in the form of batteries mounted within the I/O modules. In the event of an AC power supply failure, the batteries provide back-up power to maintain the cache memories within the I/O modules for a period of time sufficiently long so that maintenance may be carried out to restore AC power supply. The period of retention, i.e. for which the cache memory can be held up, is typically 72 hours, sufficient to retain the cached data over the length of a weekend. This would be the longest possible period of time from when a loss of power occurs until an operator can intervene to address the problem.

However, when primary power is restored to the storage system it can be difficult to process the cached data and to ensure that all such data that needs to be written to the storage media themselves is correctly routed.

According to a first aspect of the present invention, there is provided a data storage system for connection to a primary power source, the data storage system comprising: one or more data storage media; one or more interfaces, each interface able to connect to at least one of the data storage media so as to couple power from the primary power source to the at least one of the data storage media; one or more energy modules, each energy module being able to connect to an interface for providing back-up power to the one or more of the data storage media in the event of a failure of the primary power source.

A data storage system is provided in which back-up power can be provided to the storage media, such as hard disk drives, within the storage system in the event of failure of the primary power source. The ability to hold up the storage devices in the event of a failure of the primary power source is significantly advantageous as it enables the disk drives to be held up so that any data for example in the cache of the input/output units of the storage system can be written to the storage media before the system is powered down. Thus, the problem of having unwritten data in cache memory of the input/output units in the event of failure of a primary power source is addressed. It will be appreciated that "failure" in this context means the removal of the primary power source to the storage media, either deliberately or inadvertently. An inadvertent failure may be due to a power cut or other such loss of power. A deliberate failure may be if power is deliberately cut from the storage media so as to enable servicing or the like of the storage media.

In an embodiment, the data storage media are provided in a drawer, the interfaces comprising one or more baseplanes within the drawer to which the data storage media are coupled. The use of baseplanes and a drawer structure enables easy access to the storage media in the event of a power failure or simply for routine maintenance. In addition, the baseplanes provide a simple and efficient means for connection of the storage media to the primary power source and the energy modules.

In an embodiment, the drawer is divided into one or more power domains each having one or more data storage media, each domain being powered by one or more energy modules in the event of a failure of the primary power source. The domains are separate, isolated from each other, and electrically protected to prevent feedback into a failed circuit. This arrangement thus allows the power to each domain to be monitored and controlled. This mechanism allows power to the drawers to be selectively disabled in the event of failure of the primary power source.

In an embodiment, at least one of the one or more energy modules is a rechargeable energy module. The use of rechargeable energy modules in this embodiment is particularly advantageous. In normal use whilst the primary power source is working, the energy modules can be configured to be receiving power from the primary power source. This means that in the event of failure of the primary power source, the chance of the energy module not having sufficient power is significantly reduced or in some cases entirely eliminated.

In an embodiment, at least one of the one or more rechargeable energy modules is a supercapacitor module or a rechargeable battery. These are convenient and simple to use examples of the type of rechargeable energy modules that can be used. Other examples could of course also be used.

In an embodiment, at least one of the domains has at least two energy modules. This ensures redundancy in the back-up power supply and so can reduce any chance that the back-up power supply will not work in the event of failure of the primary power source. In one example the determination as to whether or not to provide redundancy in the back-up power supply can be made based on a determination as to the importance of the data stored on the storage media within a particular domain.

In an embodiment, each of the domains has at least two energy modules. This ensures that every domain has redundancy in the provision of back-up power.

In an embodiment, the energy modules are sized to correspond to the size of the data storage media. This is particularly advantageous as it enables the energy module simply to "replace" one or more of the storage media within the storage system. The energy module for example could be sized to have the same shape and dimensions as the other hard disk drives within the storage system. This will ensure that replacement of one hard disk drive will not have an effect on the physical arrangement of other disk drives within the storage system.

According to a second aspect of the present invention, there is provided a rechargeable energy module for providing back-up power to a data storage system, the rechargeable energy module comprising: a power detector to detect when a primary power source has failed; a power output and one or more rechargeable energy cells, wherein power from the one or more rechargeable energy cells is drawn from the power output when the power detector has detected that a primary power source has failed.

In an embodiment, the energy module comprises a switch to switch power from the one or more rechargeable energy cells to the power output when the power detector has detected that a primary power source has failed.

In an embodiment, the module is sized to correspond to the standard form factor of a storage medium.

According to a third aspect of the present invention, there is provided a method of providing back-up power to a data storage system comprising a primary power source for providing power to the data storage system, and one or more data storage media, the method comprising: providing one or more energy modules within the storage system and, when the primary power source fails, powering the storage media from the one or more energy modules.

Embodiments of the present will hereinafter be described by way of examples, with references to the accompanying drawings, in which.

Figure 1:
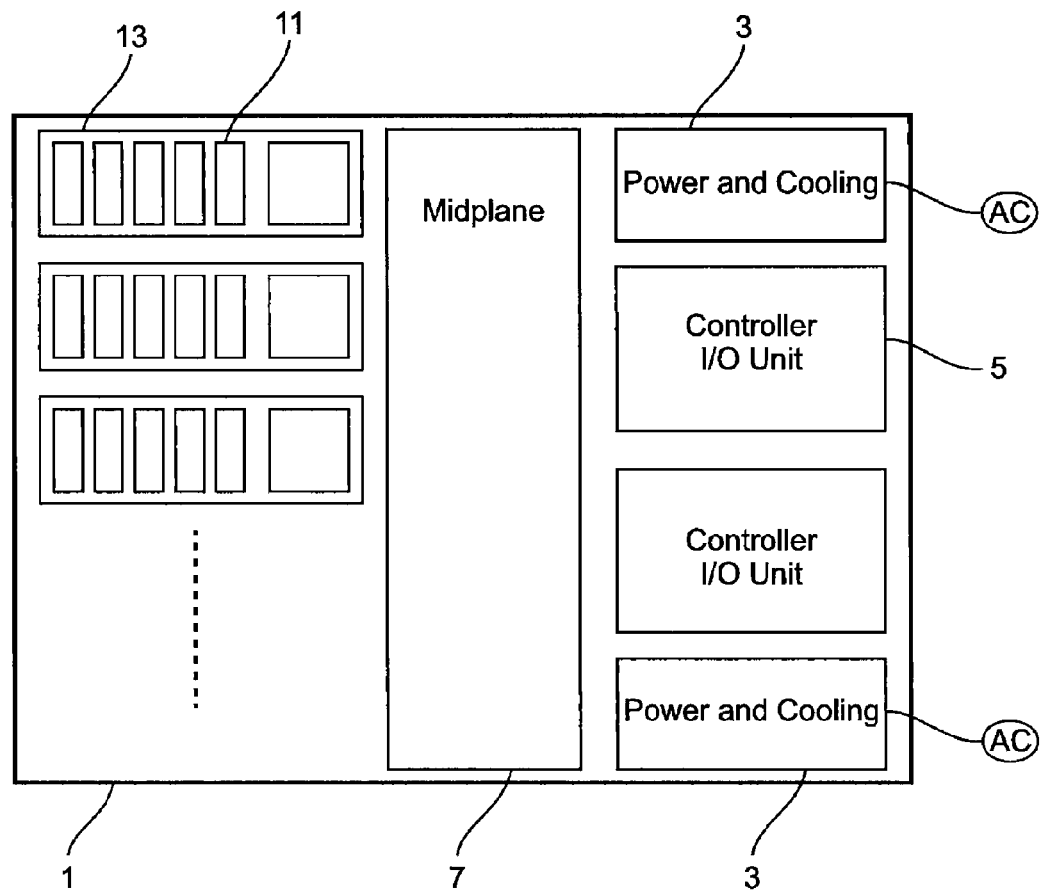
FIG. 1 is schematic representation of a data storage system.
Figure 2:
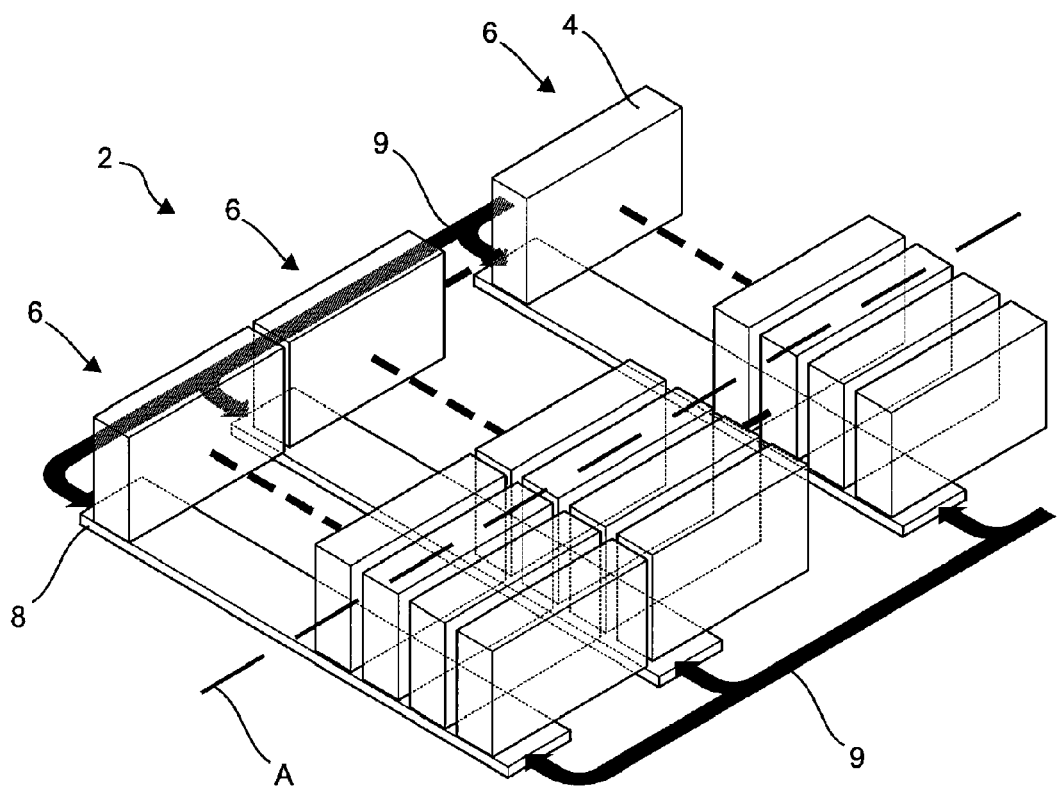
FIG. 2 is a schematic representation of a storage module for use in a data storage system.

FIG. 2 shows a portion 2 of a data storage module from a data storage system in which there is provided an array of disk drives 4 arranged in rows 6. The data storage module may be of the Titan variety discussed above but could in fact be any part of a data storage system including plural data storage devices such as hard disk drives. Each row 6 includes one or more baseplanes 8 to which the disk drives 4 of each row are connected. The baseplanes 8 serve as interfaces to which disk drives are connected. By using such an arrangement it is possible easily to connect power to the disk drives with out requiring a direct coupling between the external power source and the disk drive. In other words both the disk drives and the external or primary power source may be coupled to the interface, ensuring the disk drives are powered. It will be appreciated that the "horizontal" baseplanes (horizontal with respect to the storage module) of this embodiment are merely one example of how the baseplanes may be configured. In other examples, the baseplanes may be PCBs vertically or otherwise oriented to which disk drives, energy modules or other storage media can be plugged or connected.

The baseplanes 8 are provided with data and power connections. The baseplanes 8 (and the disk drives connected thereto) are physically connected to a housing of the storage system and thereby to the I/O modules and host control units (none of which is shown in FIG. 2) of the storage system. The disk drives may be of a common form factor. However, the disk drives may have different form factors. Indeed, the devices need not necessarily be storage devices. They can have other functionality such as, but not limited to, RAID controllers, interface switches etc. In the example shown each of the rows 6 of disk drives 4 is provided with separate data and power connections 9.

Figure 3:
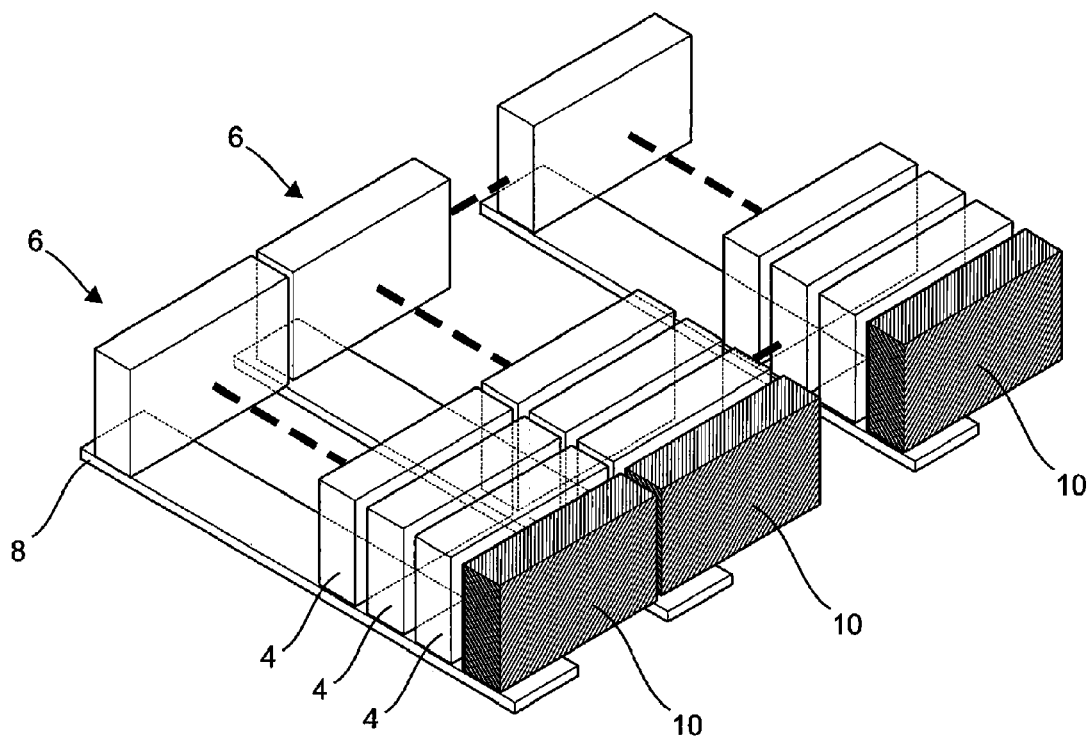
FIG. 3 is a schematic representation of a storage module for use in a data storage system, the storage module including energy modules.

As explained above, the current assignee has recognised that in certain situations it may be desirable to be able to maintain power to the disk drives themselves in the event of AC power failure, rather than just to the I/O modules, as disclosed for example in US-A-2011/0072290. This may be achieved in the present system as shown in FIG. 3, in which example one disk drive on each row 6 is replaced by an energy module 10, such as a rechargeable energy module, coupled directly to a corresponding baseplane. In the event of the AC power supply to the baseplane failing, the disk drives 4 of each row 6 may continue to be powered via the baseplane except the source of power for the baseplane is instead the energy module 10 of that same row. "Failure" of the primary power source may comprise a complete loss of power or only a partial loss of power such that the available power to the storage system is less than some defined threshold.

This arrangement works well. However, since in this example, only one energy module is used per row, failure of that module in the event of a prior failure of the AC power supply, could potentially lead to data loss. As will be explained in detail below, the arrangement of the disk drives and the drawer is such that the drawer is divided into power domains, which are separate and isolated from each other.

The domains cover the side card, front, mid and rear base planes, so that the domains are separate, isolated from each other, and electrically protected to prevent feedback into a failed circuit. This arrangement of storage media allows the power to each domain to be monitored and controlled, and it is this mechanism which allows power to the drawers to be selectively disabled in the event of AC failure. One example arrangement would recognise AC failure and selectively disable power to all of the drawer power domains. This would leave only the input/output units and cooling modules to be powered by an alternative battery sources. This is similar to the case described in USSN-A-2011/0072290.

An alternative example would be where the input/output unit contains a RAID function. In this case it may have an array to which it can write its cache data, and the array may be located on the rear baseplane. During AC failure power would be selectively disabled to the front and mid baseplanes, leaving the side cards and the rear baseplane powered. This would allow the input/output units to flush their cache to the array located on the rear baseplane. In this scenario, providing sufficient power for this from one location in the system could prove problematic since the input/output units, fans, side cards and a row of drives need to be powered. This increased power requirement is addressed by allowing the additional power of the disk drives to be scaled to the hold up requirement of the system. This function may use the same mechanism as in USSN-A-2011/0072290 whereby AC failure affects the drive power control on the drive midplane to power down individual drives.

Within the present system the fact that the domains are separate allows the energy module to act within a segregated area, so that an energy module providing power to say, a rear base plane, powers only the rear base plane and no others. This means of isolation is convenient, but could also be achieved in other ways, for instance by incorporating isolation Diodes/FETs at the power inputs on each base plane.

Figure 4:
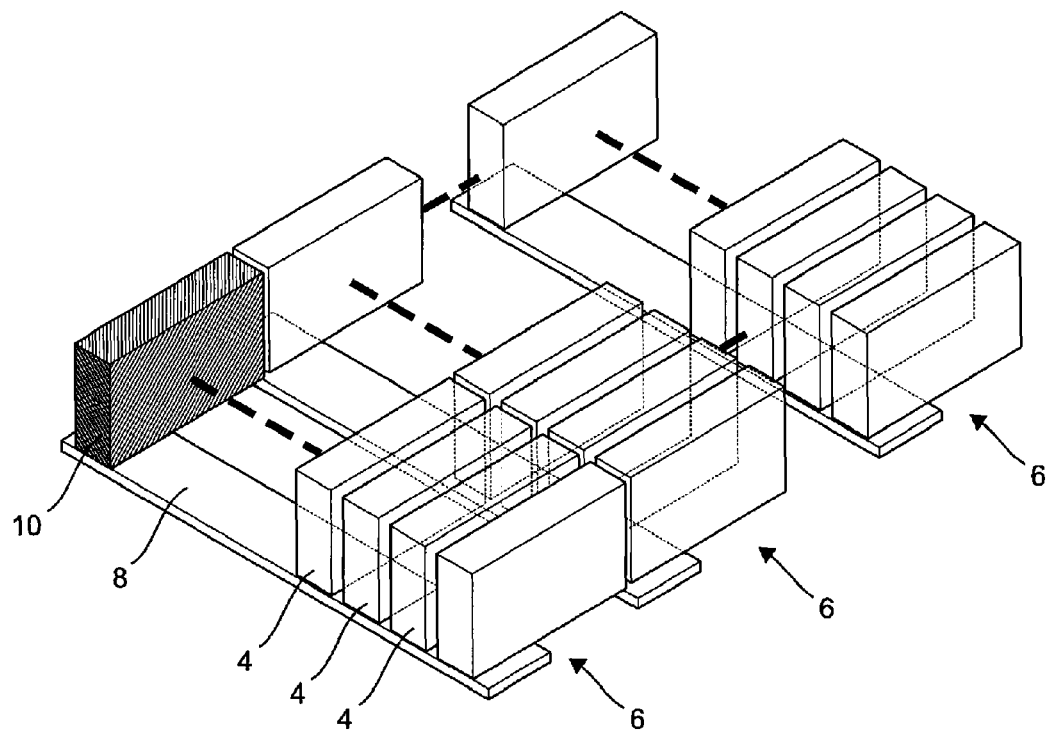
FIG. 4 is a schematic representation of a storage module for use in a data storage system, the storage module having energy modules including redundant energy modules.

FIG. 4 shows a schematic representation of another example of a drawer from a storage system. The drawer of FIG. 4 is similar to that of FIG. 3. However, the drawer is scaled such that each row 6 is provided with more than one rechargeable energy module 10. In this example, each row 6 includes two energy modules 10, which are preferably rechargeable energy modules. It will be appreciated that each row may in some cases include more than two energy modules 10. It will also be appreciated that some or all of the rows 10 may include no energy modules 10. The decision as to how many energy modules to provide is application specific and could be based on the importance of stored data. For example, for very important data some redundancy in the back-up power supply would clearly be desirable and so more than one energy module per domain would be provided. If the data is of less importance then a single energy module per domain may be provided.

This allows for the failure of a single energy module, whilst still providing a back-up power facility from the remaining energy module. In other words, redundancy is introduced to the back-up power supply for the disk drives. This scenario also provides protection when one of the energy modules is being charged, or maintained. Some types of battery (which may be used as the energy modules) require regular maintenance discharge and re-charge cycles and so the use of a redundant system such as that shown in FIG. 4 enables back-up to be provided when one of the energy modules is being recharged.

Figure 5:
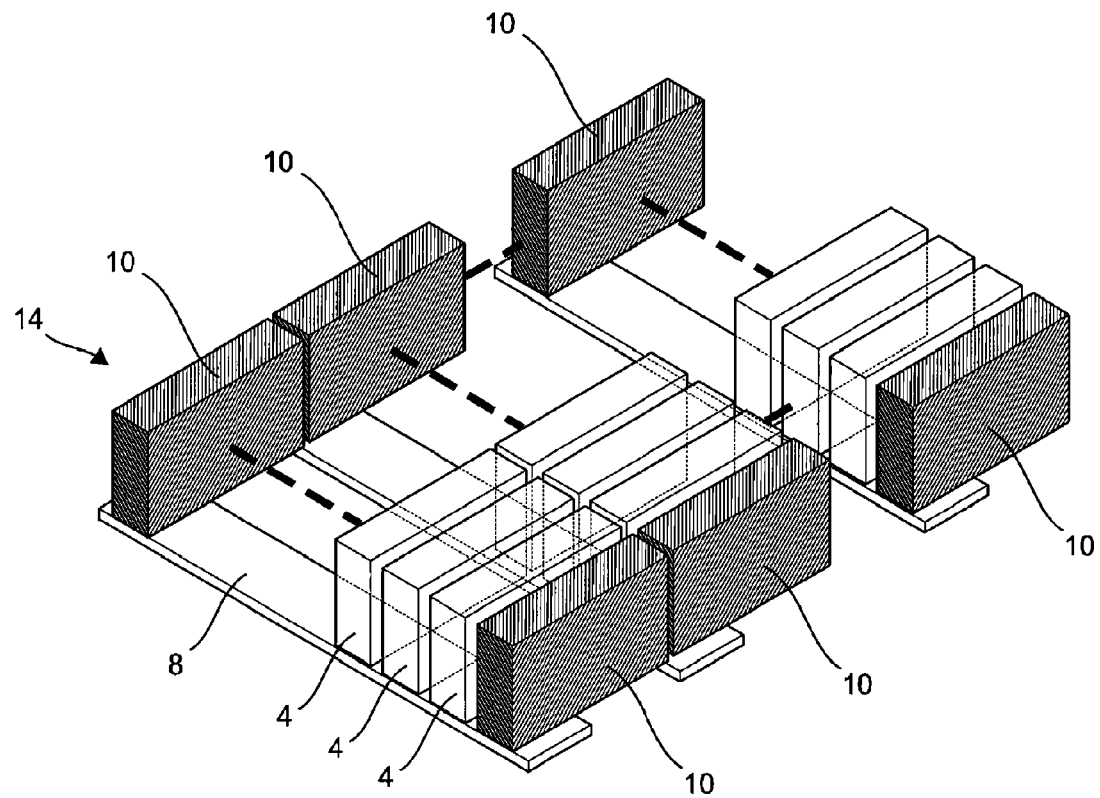
FIG. 5 is a schematic representation of a storage module including redundant energy modules for each of the power domains within the storage module.

The present system is scalable, as shown in FIG. 5 which shows a further example of a part of storage system. In this case, a drawer 14 is provided having plural rows of disk drives like those shown in FIGS. 2 to 4. In this case, each row 6 is provided with 2 energy modules 10. Thus, each domain is provided with a redundant back-up power supply.

In the example shown the storage media are of a common form factor. However, it should be noted that although all of the rows within a Titan drawer are designed to take a common storage media form factor, as stated above it is not essential for all rows to take storage devices of the same type, same form factor or the same power.

It should also be noted that within a storage system it is possible to provide the present system in which energy modules are provided to hold up the storage devices themselves in combination with a system such as that of USSN-A-2011/0072290 in which auxiliary power supplies are provided to hold up the I/O units, controllers and fans in the rear of the enclosure. The isolated hold up of the storage media of the present system could of course be used on its own without the system of USSN-A-2011/0072290.

One possible way by which the or each energy module could be connected to a storage module of a storage system will now be described with reference to FIGS. 6 to 8. The storage system is provided with a connector location for an energy module. Typically, a runner system and multi-pin connectors are used to connect the base planes 8 to the side cards. Accordingly, the disk drive connector preferably is offset slightly from the support structure and runner system. This offset allows a suitably configured energy module to be connected in all but the two locations closest to the side cards.

Figure 6:
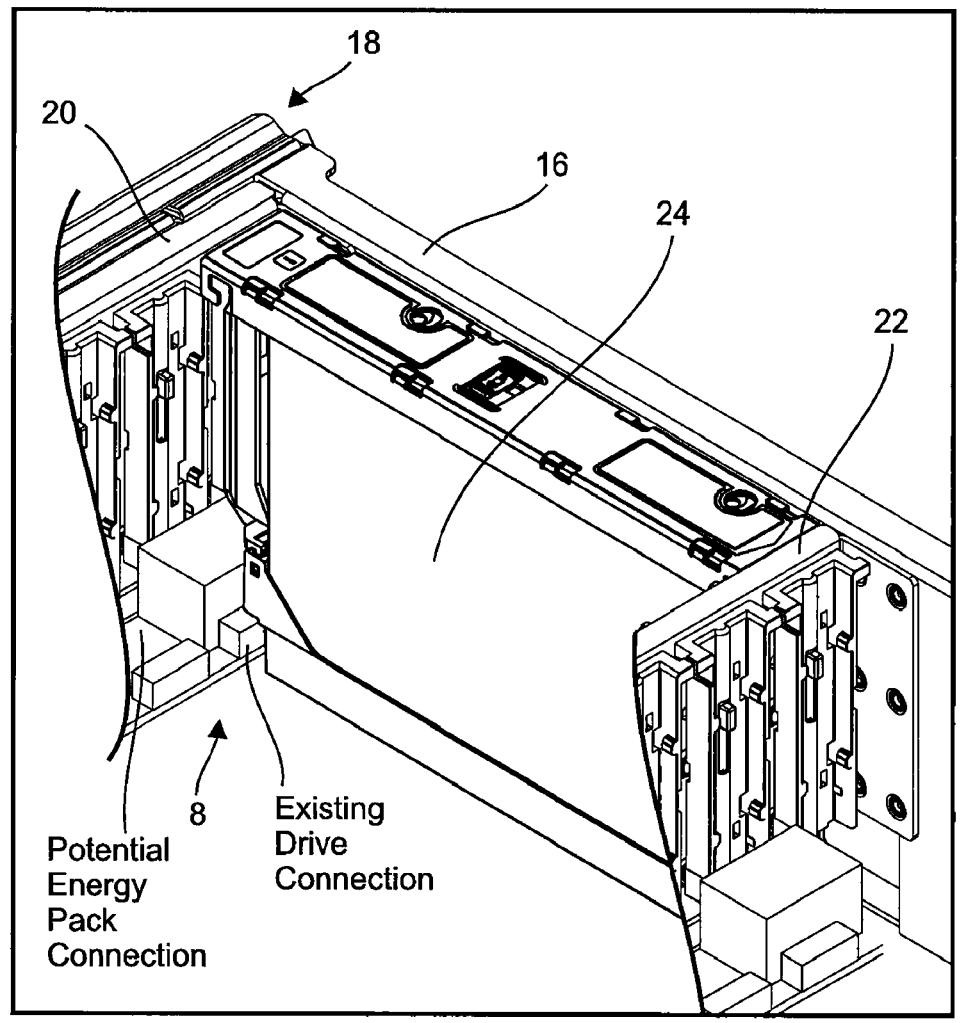
FIG. 6 is a schematic representation of part of a storage module.

FIG. 6 is as schematic representation of the corner between a sidewall and the front wall of a drawer within a storage system. The drawer has a sidewall 16 forming a corner 18 with a front wall 20 of the drawer. Typically, the drawer will have a ladder-type structure. As can be seen, the wall 16 of the drawer forms one edge of the ladder with rungs being formed by vertical slats 22. Disk drives 24 are provided arranged vertically between the rungs of the ladder structure. Such a configuration is as described in, for example, U.S. application Ser. No. 12/722,012. Due to the arrangement of the disk drive within the storage system, there exists a possibility for a connection to be established between an energy module and the baseplane 8. Thus, no modification would be required to a known storage system of this type so as to enable a disk drive 24 to be replaced with an energy module. The energy module would thus be directly coupled to a baseplane and may include logic arranged to detect when its power is required, i.e. when normal AC power to the system has been lost.

The detection of when power is required from an energy module can be provided in a number of ways. An example method may be for the energy module to monitor the voltage on the power rail that it would supply. AC to DC power supplies typically contain hold up capacitors which provide a ~20 ms of power reserve in the event of AC failure. The power supply needs some time to recognise that AC has actually failed so that it can alert the system and then time for action to be taken. This is provided by the ~20 ms hold up time. Towards the end of the hold up time the output voltage of the power supply begins to degrade, and ultimately the voltage drops below the regulated voltage and fails. The energy module(s) may be alerted to impending failure by the power supply but by monitoring the power rail can cut in to supply power when the voltage provided by the system power supplies degrades below a pre-set level.

Figure 7:
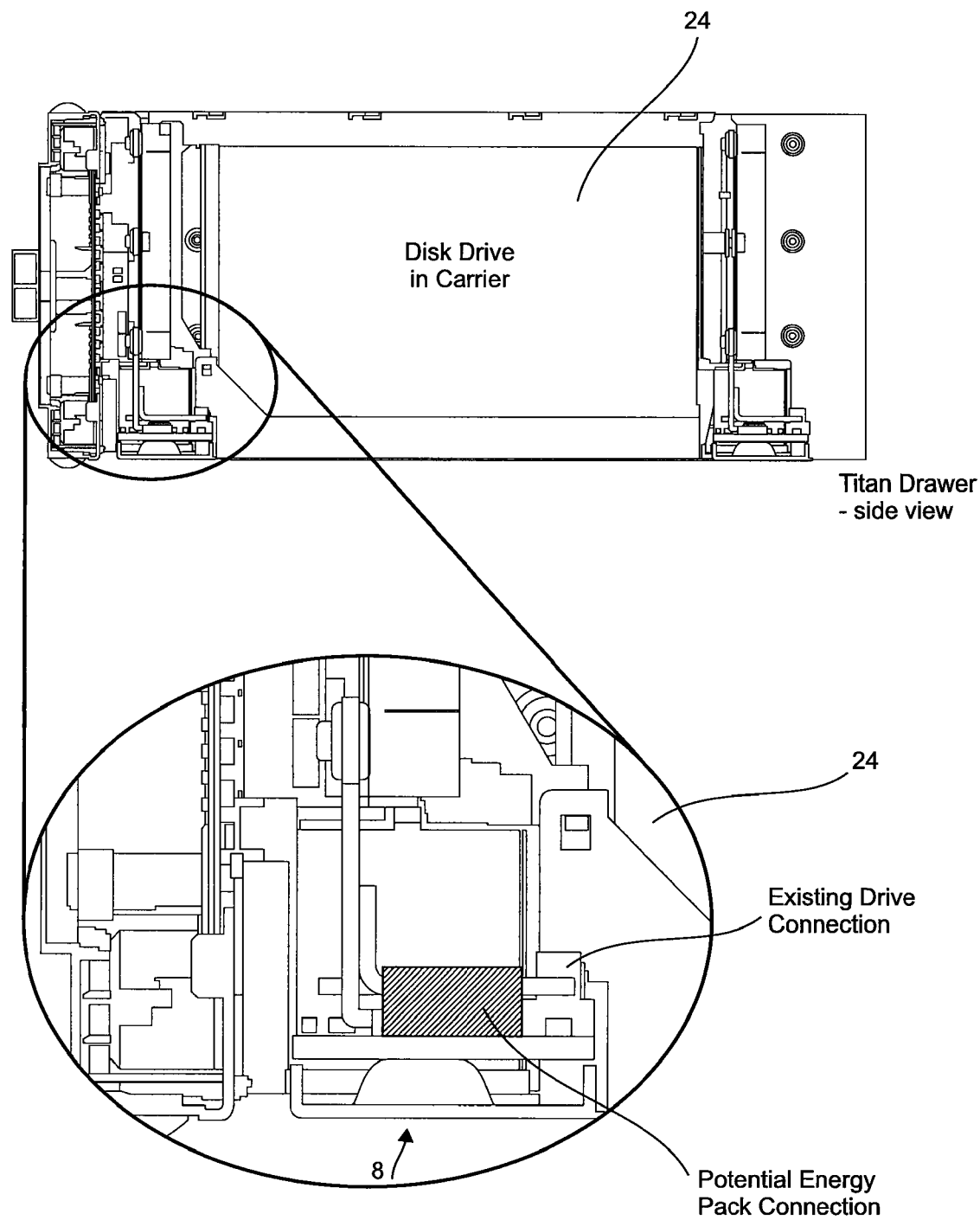
FIG. 7 is a schematic representation of a side view of a storage module showing the area for energy module connection; and, FIG. 8 is a plan view of the arrangement of FIG. 7.

FIG. 7 shows an enlarged schematic representation of a cross-section of the region of the baseplane 8 which provides power connectivity for the energy module.

Using the arrangement of the storage system as shown in FIG. 6, the rungs 22 of the storage system are able to support the weight of the disk drives and therefore also the energy module that would be provided.

Figure 8:
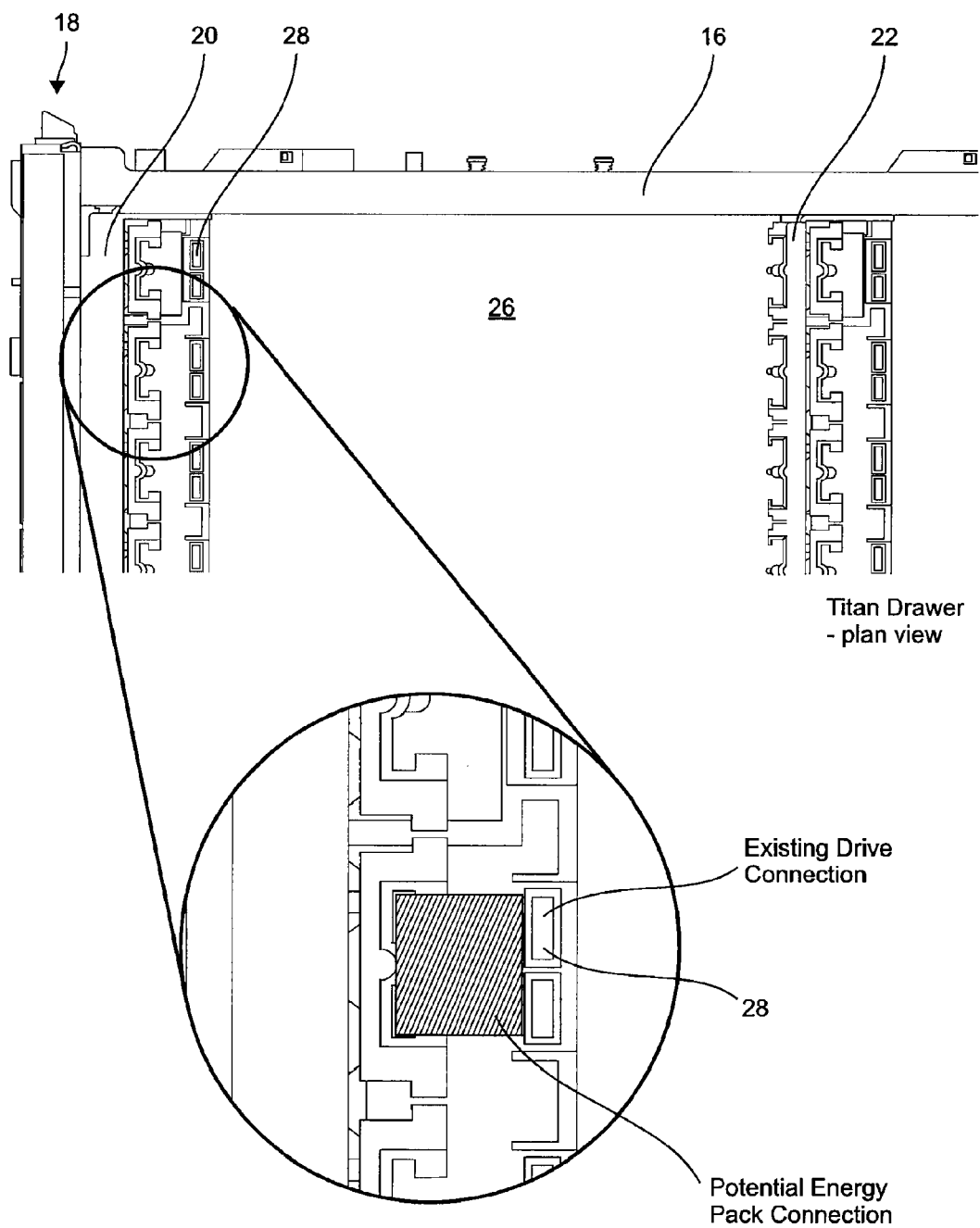

FIG. 8 shows a plan view of the device of FIGS. 6 and 7. In the example shown, no disk drive is present in the storage system. In the region 26, an energy module would be provided electrically connected to a contact region 28 electrically coupled to the baseplane which would enable power to be drawn from the energy module and provided to other disk drives provided within the storage system.

The present storage system provides scalable backup power in the event of AC power failure. In previous arrangements, such as that disclosed in our co-pending application no. USSN-A-2011/0072290, the ability to hold up devices is limited due to the location of the auxiliary power supplies within the enclosure and the size of the energy packs required. The present storage system overcomes this limitation by providing energy modules in power isolated domains within the overall storage system.

Preferably, the energy module is sized to correspond to that of a storage medium device or multiples thereof so as to enable a one-to-one (or other multiple) correspondence between the footprint of the energy module and the storage media device that is replaced by it. The energy module could be provided as a single energy module or, if required or desired in a redundant backup power supply system as explained above.

Due to the scalable nature of the energy modules, the present system could be used to maintain power to a single domain, multiple domains or, all domains within a storage system.

Typically, within a storage system, when a drawer such as that shown in FIG. 5 is pulled out from the storage system, connectivity between the mid plane which connects the I/O units and controllers with the storage media, may be maintained by a complex cabling arrangement so as to ensure that the disk drives would not be cut off from their power and data connections. However using the present system, due to the presence of the energy modules within the drawer itself, when the drawer is placed in its open position with respect to the storage system, power can be maintained to the disk drives with out requiring any complex power cabling arrangement. Thus, the removal of the drawer can cause a failure of the primary power source and so power can then be provided from the energy module(s).

Indeed, selectively a single power domain can be switched off so as to enable an individual storage medium or disk drive to be removed whereas all the other storage domains within the drawer may remain powered up by use of the energy modules. Thus, increased flexibility is provided within a storage system without the need for complex power cabling. It becomes possible selectively to replace one or more storage media without powering down all other storage media within a specific drawer and without the need for complex power cabling.

By way of example only, at today's available data rates, typically even a slow speed disk drive is able to receive data at rates of about 30 MB/s. If, within a storage module there is a row of 12 such drives ((14-2) assuming 2 energy modules and the usual capacity of 14 disk drives per row), the maximum data rate for the module as a whole would be about 360 MB/s I/O Modules/Controllers typically have 8 GB of memory, only part of which is allocated to 'cache' data. Looking forward and assuming a significantly increased value for such cache capacity of, say, 24 GB of cache, it would only take 66 seconds at 360 MB/s to write all this data to the disk drives within the storage module. If there were dual controllers within the storage system then a time of just over 2 minutes would be required to write all the data from the I/O unit cache memory to the disk drives. This is well within the capability of currently proposed energy modules such that the disk drives could be held up comfortably until all data within the cache of the I/O modules is written to them A more realistic number is probably 50 MB/s per drive (600 MB/s total). With the same 8 GB of cache this would require a time of about 13 seconds per controller I/O unit, i.e. under 30 s for dual controllers.

These also assume that all of the controller data is written to a single row of drives within a storage module. If all of the rows were operational, the time could obviously be correspondingly reduced by the appropriate factor.

Embodiments of the present invention have been described with particular reference to the examples illustrated. However, it will be appreciated that variations and modifications may be made to the examples described within the scope of the present invention.

The invention claimed is:

1. A data storage system for connection to a primary power source, the data storage system comprising:
one or more data storage media;
one or more interfaces, each interface able to connect to at least one of the data storage media so as to couple power from the primary power source to the at least one of the data storage media;
one or more energy modules, each energy module being able to connect to an interface for providing back-up power to the one or more of the data storage media in the event of a failure of the primary power source wherein, the data storage system has a plurality of power domains each having one or more data storage media, each power domain being powered by the one or more energy modules in the event of a failure of the primary power source.

2. A data storage system according to claim 1, in which the data storage media are provided in a drawer, the interfaces comprising one or more baseplanes within the drawer to which the data storage media are coupled.

3. A data storage system according to claim 1, wherein at least one of the one or more energy modules is a rechargeable energy module.

4. A data storage system according to claim 3, wherein at least one of the one or more rechargeable energy modules is a supercapacitor module or a rechargeable battery.

5. A data storage system according to claim 1, at least one of the domains having at least two energy modules.

6. A data storage system according to claim 5, in which each of the domains has at least two energy modules.

7. A data storage system according to claim 1, in which the energy modules are sized to correspond to the size of the data storage media.

8. A rechargeable energy module for providing back-up power to one of a plurality of power domains within a data storage system, the rechargeable energy module comprising:
a power detector to detect when a primary power source has failed;
a power output, and
one or more rechargeable energy cells, wherein power from the one or more rechargeable energy cells is drawn from the power output when the power detector has detected that a primary power source has failed.

9. A rechargeable energy module according to claim 8, comprising a switch to switch power from the one or more rechargeable energy cells to the power output when the power detector has detected that the primary power source has failed.

10. A rechargeable energy module according to claim 9, in which the module is sized to correspond to the standard form factor of a storage medium.

11. A method of providing back-up power to a data storage system having a plurality of power domains each having one or more data storage media and comprising a primary power source for providing power to the data storage system, the method comprising:
providing one or more energy modules to each of the plurality of power domains within the storage system and, when the primary power source fails, powering one or more of the storage media from the one or more energy modules.

12. A data storage system according to claim 2, in which the baseplane is provided at the bottom of the drawer and arranged to receive the data storage media and energy modules from above.

* * * * *